United States Patent
Brandt et al.

(10) Patent No.: US 7,180,558 B2
(45) Date of Patent: Feb. 20, 2007

(54) DSTN DISPLAY WITH ELECTROMAGNETIC SHIELDING

(75) Inventors: Peter Brandt, Aschaffenburg (DE);
Georg Nehm, Niedernberg (DE);
Werner Paulsen, Aschaffenburg (DE);
Jürgen Wenning, Mainaschaff (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/519,312

(22) PCT Filed: May 28, 2003

(86) PCT No.: PCT/DE03/01750

§ 371 (c)(1),
(2), (4) Date: Apr. 18, 2005

(87) PCT Pub. No.: WO2004/003648

PCT Pub. Date: Jan. 8, 2004

(65) Prior Publication Data

US 2005/0200787 A1    Sep. 15, 2005

(30) Foreign Application Priority Data

Jun. 26, 2002  (DE) .............................. 102 28 591

(51) Int. Cl.
*G02F 1/1347*  (2006.01)
(52) U.S. Cl. .................. 349/74; 349/75; 349/79
(58) Field of Classification Search .............. 349/75, 349/76, 74
See application file for complete search history.

(56) References Cited

U.S. PATENT DOCUMENTS

| 5,148,299 A | 9/1992 | Terada |
| 5,265,273 A | 11/1993 | Goodwin |
| 6,317,178 B1 * | 11/2001 | Brandt et al. ................. 349/72 |
| 2002/0008824 A1 | 1/2002 | Son et al. |

FOREIGN PATENT DOCUMENTS

| DE | 36 33 565 A1 | 4/1988 |
| DE | 41 40 415 A1 | 6/1993 |
| DE | 198 48 010 | 5/2001 |
| JP | 03045985 | 2/1991 |
| JP | 03153212 A | 7/1991 |
| JP | 05150214 A | 6/1993 |
| JP | 2001147441 | 5/2001 |
| JP | 2001201730 | 7/2001 |
| JP | 2001201760 A | 7/2001 |
| WO | WO 00/43832 | 7/2001 |

* cited by examiner

*Primary Examiner*—David Nelms
*Assistant Examiner*—David Chung
(74) *Attorney, Agent, or Firm*—Cohen Pontani Lieberman & Pavane LLP

(57) ABSTRACT

The invention relates to a DSTN display with electromagnetic protection, comprising an active cell (1) and a passive cell (2), whereby the active cell (1) comprises electrodes (12, 13) and the passive cell (2) faces an observer of the display. The passive cell (2) comprises a metallic transparent layer (18, 19). Said metallic layer (18, 19) is electrically connected to a ground potential (G).

6 Claims, 3 Drawing Sheets

DSTN DISPLAY WITH ELECTROMAGNETIC SHIELDING

PRIORITY CLAIM

This is a U.S. national stage of application No. PCT/DE03/01750, filed on 28 May 2003 which claims priority on the following applications: Country: Germany, Application No. 102 28 591.8, Filed: Jun. 26, 2002.

BACKGROUND OF THE INVENTION

1. Field of the Invention

The invention relates to a Double-Layer Super Twisted Nematic(DSTN) display with electromagnetic shielding.

2. Description of the Prior Art

The active cells of a DSTN display have two transparent plates (for example made of glass or plastic) arranged at a distance from one another. Transparent electrodes are fitted on the surfaces of the sides of the plates that are assigned to one another, a liquid crystal substance being arranged between said electrodes. Depending on the applied voltage, the liquid crystal substance changes the plane of polarization of the light penetrating through the liquid crystal substance. Outside the liquid crystal, a total of two pole filters are arranged in the beam path of the light penetrating through the liquid crystal cell, which filters transmit light only in one plane of polarization. Thus, the light beams are transmitted or blocked depending on the position of the pole filters with respect to one another and the driving of the electrodes, with the result that a correspondingly driven pixel of the display appears dark or bright.

For the improvement of the image quality, DSTN cells also include a passive cell arranged in the beam path of the light the passive cell includes a liquid crystal substance likewise arranged between two transparent plates and has an opposite modular orientation in contrast to the liquid crystal substance of the active cell.

The driving of the individual pixels gives rise to electromagnetic interference on account of the high driving frequencies that occur in this case, which electromagnetic interference can penetrate toward the outside unimpeded if no countermeasures are implemented. Furthermore, in particular in the context of use in motor vehicles, in the case of a user of the motor vehicle, due to friction between the user's clothing and cover materials of the motor vehicle seats or the seat belts of the motor vehicle, the user may be charged to high static voltages. If a part of the user's body then comes in proximity to the display, voltage flashovers may occur which may damage or even destroy the display. Therefore, it is known from the prior art to provide a metal frame for protecting the display, but the metal frame is an additional component and is complicated and expensive to produce.

SUMMARY OF THE INVENTION

It is an object of the invention to specify effective electromagnetic protection for a DSTN display which, moreover, is constructed inexpensively and simply.

According to the invention, the object is achieved by virtue of the fact that at least one of the bodies of the passive cell is provided with a transparent, electrically conductive layer that is connected to a defined potential, in particular the ground potential.

Thus, electromagnetic interference caused by the display is effectively shielded toward the outside. At the same time, the display is protected from external interference.

A coating made of ITO (Indium Tin Oxide) has good transparency and is not conspicuous.

The fact that the electrically conductive layer completely covers the plate in the display region means that a reliable shielding effect is present and the coating of the plate is particularly simple. The connection of the metallic layer to the ground potential can be realized particularly simply by means of a flexible sheet conductor.

Particularly good reliable shielding can be realized by virtue of the fact that the display, with the exception of the display region perceptible by an observer, is surrounded by a housing made of metal or metallized material.

BRIEF DESCRIPTION OF THE DRAWINGS

The invention is explained in more detail below with reference to the figures, in which.

DETAILED DESCRIPTION OF THE PRESENTLY PREFERRED EMBODIMENTS

Figure 1:
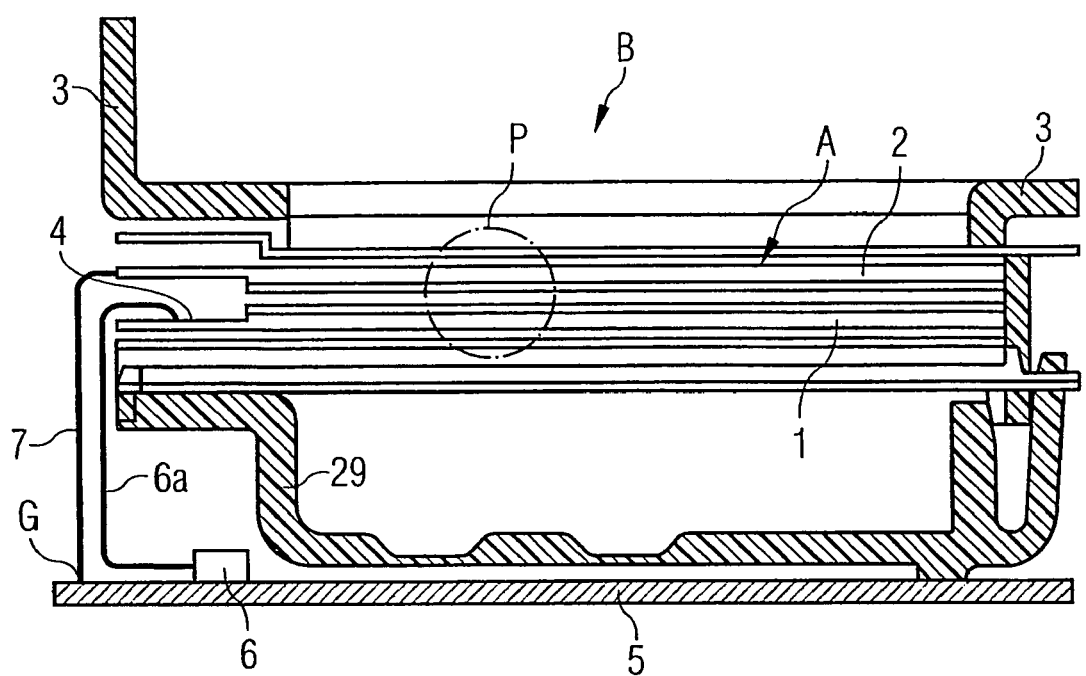
FIG. 1 is a sectional view through a DSTN display according to the invention.

A display A has an active cell 1 and a passive cell 2, the passive cell 2 facing a possible observer B. the display A is surrounded by a covering 3. The active cell 1 is electrically conductively connected via a connection 4 to a control circuit 6—which is arranged on a printed circuit board 5—via a control line 6a. The passive cell 2 is electrically conductively connected to a ground potential G via a flexible sheet conductor 7. An optical waveguide 29 serves for back lighting of the display.

Figure 2:
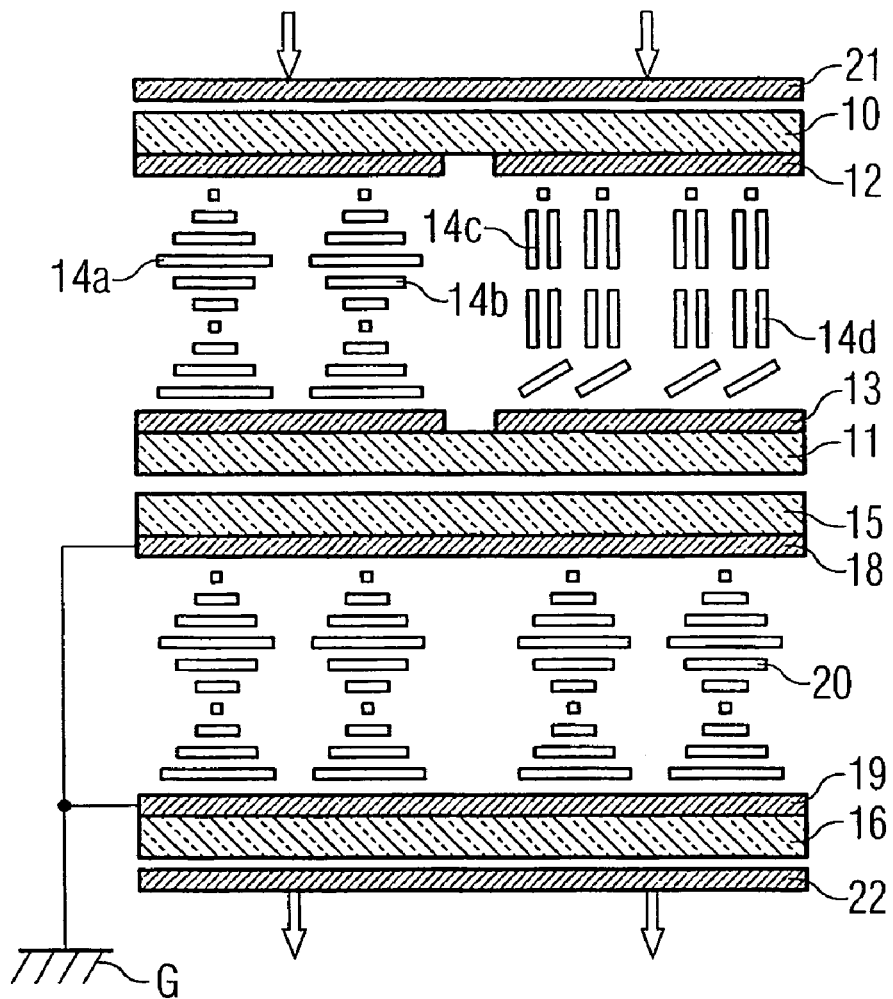
FIG. 2 is a partial sectional view of area P from FIG. 1.

FIG. 2 reveals the construction of the DSTN display. The active cell 1 has two transparent plates 10, 11 on which electrodes 12, 13 are respectively arranged. A liquid crystal substance 14a–14d is situated between the electrodes 12, 13. The passive cell 2 likewise has two transparent plates 15, 16 covered, preferably areally, on their inner sides respectively by a transparent, electrically conductive layer 18, 19, preferably ITO (indium tin oxide). A liquid crystal substance 20 is situated between the electrically conductive layers 18, 19. A pole filter 21, 22) is respectively applied areally on the outer sides of the plates 10, 16, so that initially unpolarized light can penetrate into the active cell in polarized fashion. If no voltage is present, as in the case of the liquid crystals 14a, 14b illustrated, the plane of polarization of the light is rotated through approximately 270°. If a voltage is present, as is illustrated on the right for the liquid crystals 14c, 14d, the plane of polarization of the light is not rotated in the active cell. Liquid crystals 20 of the passive cell do not lie in a voltage field and all rotate the plane of polarization of the light through 270° in a direction of rotation opposite to the direction of rotation of the liquid crystals 14c–14d in a non-driven state. Color effects are thus compensated for. If the electrodes 12, 13 are driven, the polarized light can penetrate through the pole filter 22, as is illustrated by the arrow a.

Figure 3:
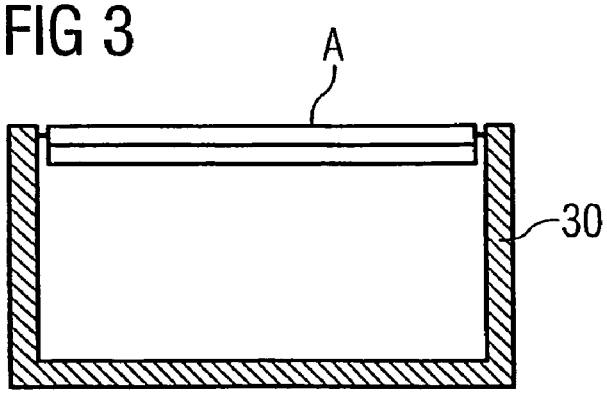
FIG. 3 is a sectional view through an embodiment with a metallic housing.

FIG. 3 reveals that the display A, with the exception of the region visible to the observer B, is surrounded by a housing 30 made of metal or metallized material. The housing 30 is electrically conductively connected to the electrically conductive layers 18, 19 illustrated in FIG. 2.

Figure 4:
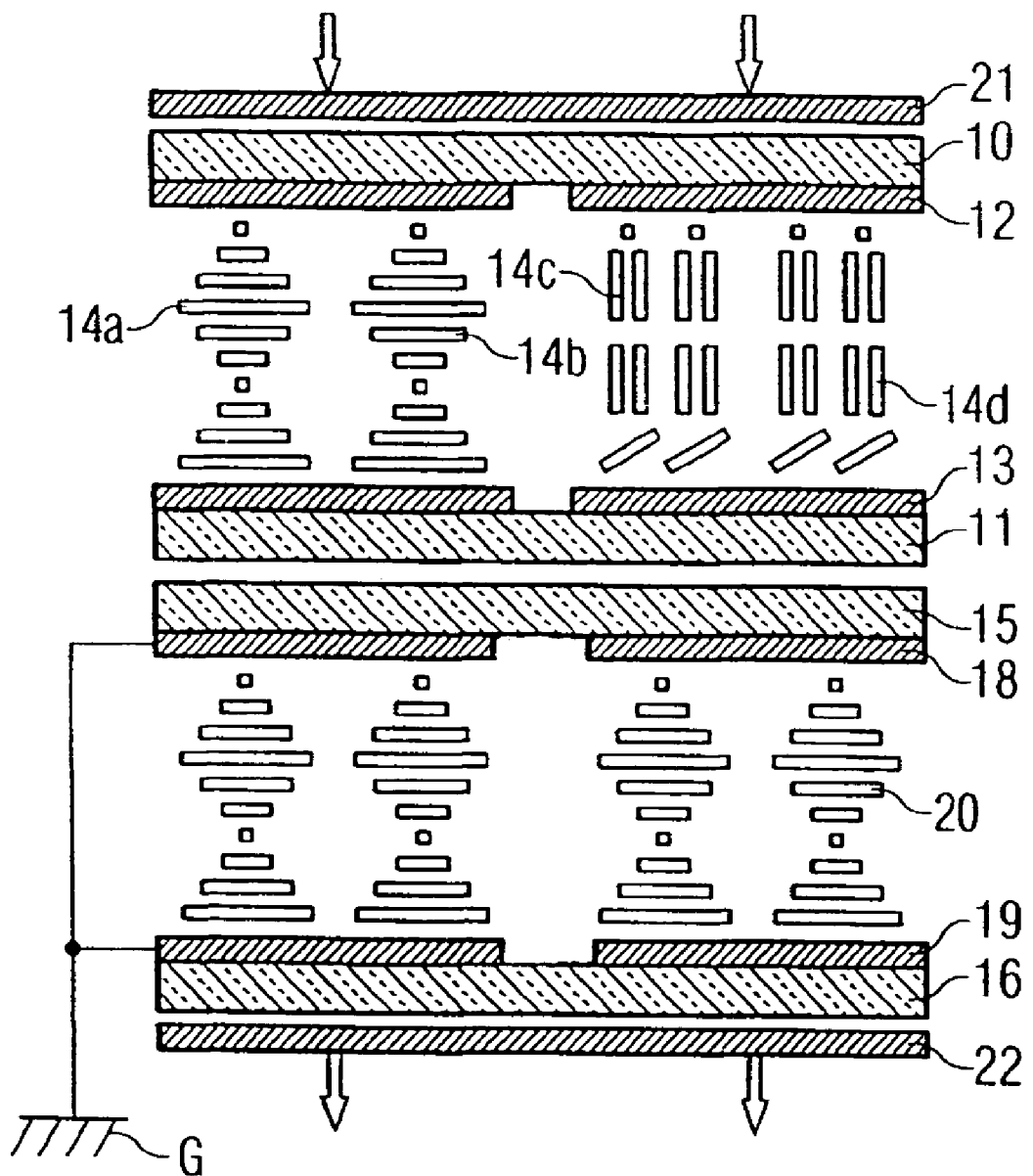
FIG. 4 is a partial sectional view of a another embodiment corresponding to area P shown in FIG. 2.

The invention can readily be modified. Thus, is suffices, by way of example, to provide only one of the two electrically conductive layers 18, 19. Furthermore, it suffices if the electrically conductive layer is not applied completely areally, but rather is partly interrupted under certain circumstances, as shown in FIG. 4.

What is claimed is:

1. A Double Super Twisted Nematic display with electromagnetic protection, comprising:

an active cell having electrodes;

a passive cell, wherein said passive cell is arranged at a front of said display and faces an observer of the display, said passive cell having an electrically conductive transparent layer electrically connected to a predetermined potential such that said passive cell prevents electromagnetic interference generated by said display from radiating therethrough and simultaneously shields said display from external interference, said electrically conductive layer being at least partly interrupted.

2. The display of claim 1, wherein said electrically conductive transparent layer consists essentially of indium tin oxide.

3. The display of claim 1, further comprising a flexible sheet conducts connecting said electrically conductive transparent layer to said predetermined potential.

4. The display of claim 1, further comprising a metallic housing surrounding a rear and sides of said display, said electrically conductive transparent layer being electrically connected to said housing.

5. The display of claim 1, wherein said predetermined potential is ground potential.

6. The display of claim 1, wherein said electrically conductive transparent layer of said passive cell comprise electrodes of said passive cell.

* * * * *